(12) United States Patent
Yang et al.

(10) Patent No.: US 11,110,540 B2
(45) Date of Patent: Sep. 7, 2021

(54) EXTRUDER FOR METAL MATERIAL AND 3D PRINTER USING THE SAME

(71) Applicants: Electronics and Telecommunications Research Institute, Daejeon (KR); Daelim Chemical Co., Ltd., Gyeongsangnam-do (KR)

(72) Inventors: Yong Suk Yang, Daejeon (KR); hong hyun Shin, Seoul (KR); Bonjin Koo, Daejeon (KR); In-Kyu You, Gongju-si (KR); sunghoon Hong, Daejeon (KR)

(73) Assignees: Electronics and Telecommunications Research Institute, Daejeon (KR); Daelim Chemical Co., Ltd., Gyeongsangnam-do (KR)

( * ) Notice: Subject to any disclaimer, the term of this patent is extended or adjusted under 35 U.S.C. 154(b) by 1022 days.

(21) Appl. No.: 15/583,155

(22) Filed: May 1, 2017

(65) Prior Publication Data
US 2017/0312849 A1    Nov. 2, 2017

(30) Foreign Application Priority Data

May 2, 2016 (KR) .................. 10-2016-0054242
Dec. 5, 2016 (KR) .................. 10-2016-0164670

(51) Int. Cl.
*B23K 13/01* (2006.01)
*B22F 10/10* (2021.01)
(Continued)

(52) U.S. Cl.
CPC .............. *B23K 13/01* (2013.01); *B22F 10/10* (2021.01); *B23K 37/06* (2013.01); *B28B 1/001* (2013.01);
(Continued)

(58) Field of Classification Search
CPC ....... B21C 23/005; B21C 23/02; B21C 23/04; B21C 29/003; B21C 29/02; B21C 33/02;
(Continued)

(56) References Cited

U.S. PATENT DOCUMENTS

| | | | | |
|---|---|---|---|---|
| 4,925,103 A | * | 5/1990 | Muench | B05B 5/00 118/300 |
| 5,084,091 A | * | 1/1992 | Yolton | B22F 9/08 75/336 |

(Continued)

FOREIGN PATENT DOCUMENTS

| | | | |
|---|---|---|---|
| CN | 2649227 Y | * | 10/2004 |
| CN | 203764977 U | * | 8/2014 |

(Continued)

OTHER PUBLICATIONS

English translate (CN204490969U), Retrieved date Aug. 3, 2020.*
(Continued)

*Primary Examiner* — Adam J Eiseman
*Assistant Examiner* — Mohammed S. Alawadi
(74) *Attorney, Agent, or Firm* — Rabin & Berdo, P.C.

(57) ABSTRACT

An extruder for a metal material includes a cylinder having a receiving space in which a solid metal material is provided, a nozzle extending from a lower end of the cylinder, an upper coil provided on an outer surface of the cylinder and melting the solid metal material to form a liquid metal material, and a first lower coil provided on an outer surface of the nozzle to control an extruded shape of the liquid metal material.

12 Claims, 9 Drawing Sheets

(51) Int. Cl.
   *B29C 64/209* (2017.01)
   *B29C 48/15* (2019.01)
   *B33Y 30/00* (2015.01)
   *B33Y 40/00* (2020.01)
   *B23K 37/06* (2006.01)
   *B28B 1/00* (2006.01)
   *H05B 6/14* (2006.01)
   *H05B 6/44* (2006.01)
   *B33Y 50/02* (2015.01)
   *B22F 3/115* (2006.01)
   *B29C 48/00* (2019.01)
   *B33Y 70/00* (2020.01)

(52) U.S. Cl.
   CPC .............. *B29C 48/00* (2019.02); *B29C 48/15* (2019.02); *B29C 64/209* (2017.08); *B33Y 30/00* (2014.12); *B33Y 40/00* (2014.12); *B33Y 70/00* (2014.12); *H05B 6/14* (2013.01); *H05B 6/44* (2013.01); *B22F 2999/00* (2013.01)

(58) Field of Classification Search
   CPC ...... B23K 13/01; B23K 37/06; B29C 64/209; B29C 48/15; B29C 48/00; B33Y 30/00; B33Y 40/00; B33Y 70/00; B33Y 50/02; B28B 1/001; H05B 6/14; H05B 6/44; B22F 3/115; B22F 2999/00; B22F 3/008
   See application file for complete search history.

(56) References Cited

U.S. PATENT DOCUMENTS

| | | | | |
|---|---|---|---|---|
| 5,121,329 | A * | 6/1992 | Crump | B33Y 40/00 700/119 |
| 5,340,377 | A * | 8/1994 | Accary | B22F 9/08 75/334 |
| 5,622,216 | A * | 4/1997 | Brown | B22D 11/00 164/71.1 |
| 6,717,118 | B2 * | 4/2004 | Pilavdzic | B29C 45/74 219/601 |
| 9,993,982 | B2 | 6/2018 | Sherrer et al. | |
| 10,350,707 | B2 * | 7/2019 | Pan | B23K 26/144 |
| 10,645,762 | B2 * | 5/2020 | Elserman | H05B 6/36 |
| 2003/0081082 | A1 * | 5/2003 | Jeanmaire | B41J 2/09 347/74 |
| 2003/0156964 | A1 * | 8/2003 | Kikuchi | H01F 1/0551 419/34 |
| 2005/0181090 | A1 * | 8/2005 | Olaru | B29C 45/2737 425/549 |
| 2006/0071978 | A1 * | 4/2006 | Steiner | B41J 2/03 347/55 |
| 2006/0119669 | A1 * | 6/2006 | Sharma | H05K 3/125 347/82 |
| 2012/0026253 | A1 * | 2/2012 | Xie | B41J 2/105 347/77 |
| 2015/0032241 | A1 | 1/2015 | Lee et al. | |
| 2015/0140153 | A1 * | 5/2015 | Stirling | H05B 6/14 425/174.8 R |
| 2015/0254502 | A1 | 9/2015 | Lim et al. | |
| 2015/0273577 | A1 * | 10/2015 | Vader | B33Y 10/00 164/46 |
| 2016/0286611 | A1 | 9/2016 | Park et al. | |
| 2016/0318105 | A1 * | 11/2016 | Gerking | C04B 35/626 |
| 2017/0094726 | A1 * | 3/2017 | Elserman | H05B 6/06 |
| 2018/0027616 | A1 * | 1/2018 | Rios | B33Y 30/00 219/603 |

FOREIGN PATENT DOCUMENTS

| | | | |
|---|---|---|---|
| CN | 203764977 | U | 8/2014 |
| CN | 104588673 | A * | 5/2015 |
| CN | 104588673 | A | 5/2015 |
| CN | 104646670 | A | 5/2015 |
| CN | 204490969 | U | 7/2015 |
| CN | 204490969 | U * | 7/2015 |
| CN | 204505858 | U | 7/2015 |
| JP | S64-75164 | A | 3/1989 |
| KR | 2008-0025425 | A | 3/2008 |
| KR | 10-1248164 | B1 | 3/2013 |
| KR | 2014-0038483 | A | 3/2014 |
| KR | 10-1450209 | B1 | 10/2014 |
| KR | 10-2015-0032099 | A | 3/2015 |
| KR | 10-2015-0053496 | A | 5/2015 |
| KR | 10-2016-0020299 | A | 2/2016 |
| WO | WO-2015/068936 | A1 | 5/2015 |
| WO | WO-2015/172540 | A1 | 11/2015 |

OTHER PUBLICATIONS

English translate (CN104588673B), Retrieved date Aug. 4, 2020.*
English translate (CN203764977U), Retrieved date Aug. 4, 2020.*
English translate (CN2649227Y), Retrieved date Aug. 4, 2020.*

* cited by examiner

EXTRUDER FOR METAL MATERIAL AND 3D PRINTER USING THE SAME

CROSS-REFERENCE TO RELATED APPLICATIONS

This U.S. non-provisional patent application claims priorities under 35 U.S.C. § 119 of Korean Patent Application Nos. 10-2016-0054242, filed on May 2, 2016, and 10-2016-0164670, filed on Dec. 5, 2016, the entire contents of which are hereby incorporated by reference.

BACKGROUND

The present disclosure relates to an extruder for a metal material and a three-dimensional (3D) printer using the same, and more particularly, to an extruder for a metal material having an improved extrusion performance and a 3D printer using the same.

3D printing refers to processes in which a 3D printer receives information designed in 3D and outputs a 3D physical object by using the received information. The 3D printer is capable of relatively conveniently making a 3D physical object using a digital drawing. A 3D drawing is drawn through a program such as a 3D computer-aided design (CAD) capable of drawing a 3D drawing for 3D printing. A physical article may be mocked up from the beginning, or made by modifying a basic shape provided in a template. Several 3D printing service companies provide an online tool enabling even an ordinary person to easily draw a 3D drawing. The 3D drawing may also be created by merely using a 3D scanner or by a mechanical method of taking a picture without drawing a drawing. In industrial fields, the 3D printer is partially used in a manufacturing process.

SUMMARY

The present disclosure provides an extruder for a metal material using an induction heating method.

The present disclosure also provides an extruder for a metal material, capable of controlling an extrusion shape of the metal material.

The present disclosure also provides an extruder for a metal material capable of enhancing adhesion between metal materials extruded onto a support unit.

However, the inventive concept is not limited to the disclosure set forth herein.

An embodiment of the inventive concept provides an extruder for a metal material, the extruder including: a cylinder having a receiving space in which a solid metal material is provided; a nozzle extending from a lower end of the cylinder; an upper coil provided on an outer surface of the cylinder and configured to melt the solid metal material to form a liquid metal material; and a first lower coil provided on an outer surface of the nozzle and configured to control an extruded shape of the liquid metal material.

In an embodiment, the upper coil may produce a magnetic field inside the cylinder in order to induction heat the cylinder and the solid metal material.

In an embodiment, the upper coil may include a first coil provided adjacent to an upper portion of the cylinder, and a second coil provided adjacent to a lower portion of the cylinder, wherein the first coil may produce a first magnetic field inside the upper portion of the cylinder, and the second coil may produce a second magnetic field which is greater than the first magnetic field inside the lower portion of the cylinder.

In an embodiment, the upper coil may be wound in a helical shape around the cylinder.

In an embodiment, the upper coil may be more densely wound around the lower portion of the cylinder than around the upper portion of the cylinder.

In an embodiment, the cylinder and the nozzle may include a non-magnetic metal.

In an embodiment, the cylinder may include a non-magnetic metal, and the nozzle may include a non-metal.

In an embodiment, the first lower coil may produce an induction current on the surface of the liquid metal material inside the nozzle in order to control the extruded shape of the liquid metal material.

In an embodiment, the extruder for a metal material may further include a second lower coil disposed adjacent to a lower portion of the nozzle and configured to heat a metal material extruded from the nozzle onto a support part.

In an embodiment, the second lower coil may produce a magnetic field passing through the extruded metal material in order to induction heat the metal material.

In an embodiment, the first lower coil may be provided between the second lower coil and the nozzle.

In an embodiment, the second lower coil and the nozzle may be disposed at the same height from an upper surface of the support part.

In an embodiment, the second lower coil may be provided closer to the nozzle than to the upper surface of the support part.

In an embodiment, the extruder for a metal material may further include a temperature measurement unit configured to measure a temperature inside the cylinder.

In an embodiment, the extruder for a metal material may further include a control unit configured to adjust a temperature of the cylinder on the basis of data for the temperature inside the cylinder measured by the temperature measurement unit.

In an embodiment, the control unit may adjust the temperature of the cylinder by controlling a current flowing in the upper coil.

In an embodiment, the upper coil and the first lower coil may receive a current different from each other.

In an embodiment of the inventive concept, a 3D printer includes: a support unit; a metal material printing unit configured to extrude a metal material onto the support unit; and a non-metal material printing unit configured to extrude a non-metal material onto the support unit, wherein the metal material printing unit includes: a cylinder having a receiving space in which a solid metal material is provided; a nozzle extending from a lower end of the cylinder; an upper coil provided on an outer surface of the cylinder and configured to melt the solid metal material to form a liquid metal material; and a lower coil disposed on an outer surface of the nozzle and configured to control an extruded shape of the liquid metal material.

In an embodiment, the metal material printing unit may further include a metal material supply unit providing the solid metal material inside the cylinder, wherein the solid metal material may be a filament type or a powder type.

In an embodiment, the solid metal material may be a filament type, and the solid metal supply unit may include a cartridge.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
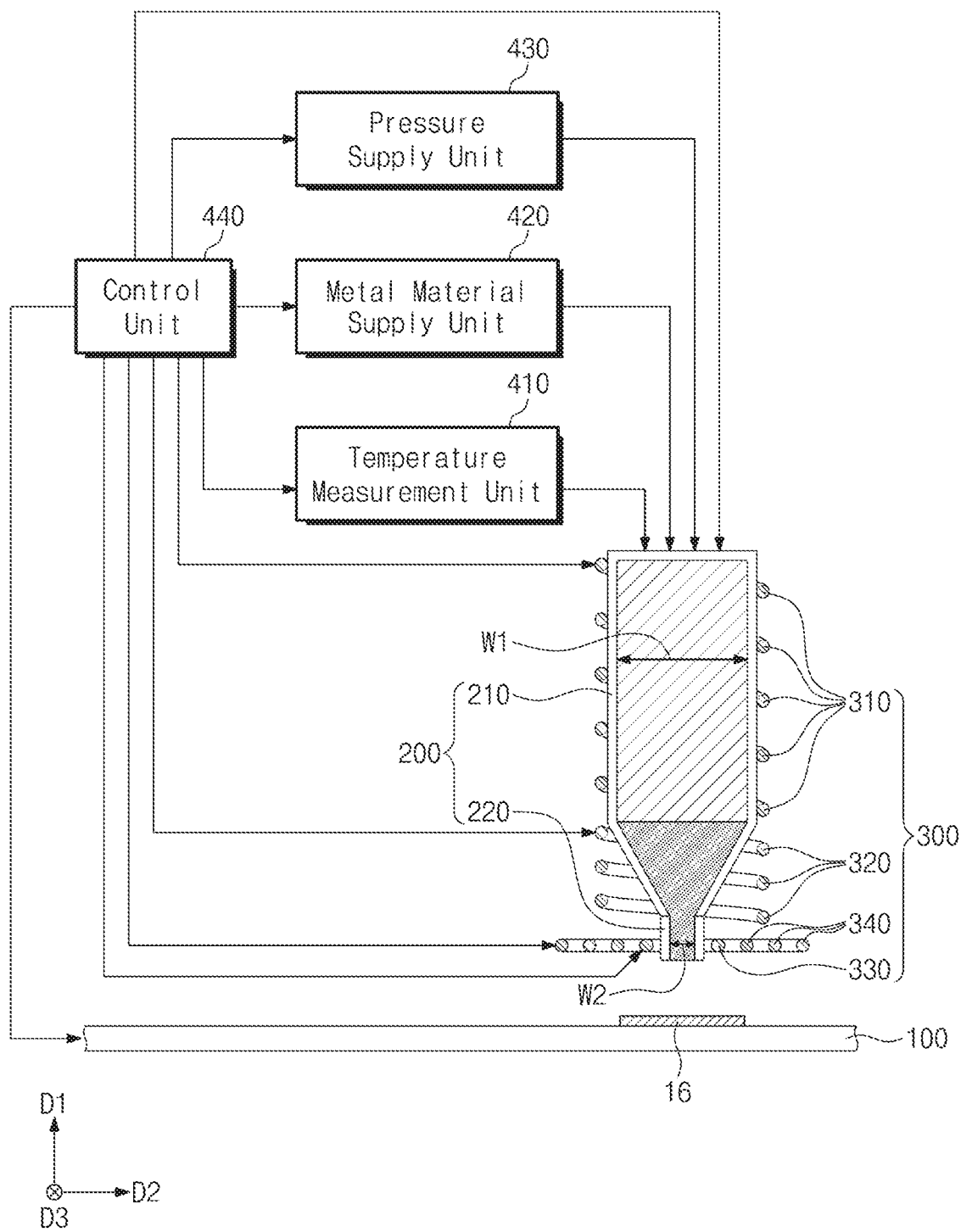
FIG. 1 is a cross-sectional view of an extruder for a metal material according to exemplary embodiments of the inventive concept.

For full understanding of configurations and advantages of the technical idea of the present invention, preferred embodiments of the present invention will be described in more detail with reference to the accompanying drawings. The present invention may, however, be embodied in various forms and should not be construed as limited to the embodiments set forth herein. Rather, these embodiments are provided so that this disclosure will be thorough and complete, and will fully convey the scope of the present invention to those skilled in the art.

In the specification, it will be understood that when an element is referred to as being 'on' another element, it can be directly on the other element, or intervening elements may also be present. Like reference numerals refer to like elements throughout.

The embodiments in the detailed description will be described with sectional views and/or flowcharts as ideal exemplary views of the present invention. In the figures, the dimensions of layers and regions are exaggerated for clarity of illustration. Areas exemplified in the drawings have general properties, and are used to illustrate a specific shape of a semiconductor package region. Though terms like a first, a second, and a third are used to describe various regions and layers in various embodiments of the present invention, the regions and the layers are not limited to these terms. Thus, this should not be construed as limited to the scope of the present invention. These terms are used only to discriminate one region or layer from another region or layer. Embodiments described and exemplified herein also include a complementary embodiment thereof.

In the following description, the technical terms are used only for explaining specific embodiments while not limiting the present invention. The terms of a singular form may include plural forms unless referred to the contrary. The meaning of "include," "comprise," "including," and/or "comprising," specifies an element but does not exclude presence or addition of one or more other elements.

Hereinafter, preferred embodiments of the inventive concept will be described in detail with reference to the accompanying drawings.

FIG. 1 is a cross-sectional view of an extruder for a metal material according to exemplary embodiments of the inventive concept.

Referring to FIG. 1, an extruder may include a support unit 100, an extrusion unit 200 melting and extruding a metal material (not illustrated) onto the support unit 100, a coil unit 300 surrounding the extrusion unit 200, a temperature measurement unit 410, a metal material supply unit 420, a pressure supply unit 430 and a control unit 440.

Hereinafter, the metal material may include a metal having eutectic properties (or an eutectic metal) (for example, Ga—In-based metal, Ga—In—Sn-based metal, Ga—Sn-based metal and Pb—Sn-based metal), a mixture metal including an eutectic metal (for example, a mixture of an eutectic metal and particles of Cu, Ag, Au, Al and/or Pt having a size of several to several hundred nanometer (nm) or several to several hundred micrometer (μm)), an alloy containing Au (for example, an alloy of Au and at least one of Sn, Si, Ge, Sb, Ga, In or Bi), a metal mixture including the Au-containing alloy (a mixture of the Au-containing alloy and Cu, Ag, Au, Al and/or Pt particles having a size of several to several hundred nanometer (nm) or several to several hundred micrometer (μm)), or a refractory metal (for example, Al and AlSi).

The support unit 100 may provide a region to which a metal material is extruded. The support unit 100 may include a heat-resistant material. The support unit 100 may not be melted even when contacting the extruded metal material. In another exemplary embodiment, the support unit 100 may be moved by the control unit 440. For example, the support unit 100 may be moved by the control unit 440 in a direction parallel with an upper surface of the support unit 100 so as to control an extrusion location of the metal material. In another embodiment, the location of the support unit 100 may be fixed. A susceptor (not illustrated) may be provided on the support unit 100. The susceptor may cool down or heat a metal material extruded thereon.

The extrusion unit 200 may include a cylinder 210 providing a receiving space in which a metal material is received, and a nozzle 220 extending from a lower end of the cylinder 210. In exemplary embodiments, the cylinder 210 and the nozzle 220 may have a cylindrical structure. The cylinder 210 and the nozzle 220 may have a cylindrical structure having a central axis along a first direction D1 perpendicular to the upper surface of the support unit 100. An inner surface of the cylinder 210 and an inner surface of the nozzle 220 may respectively have diameters W1 and W2 along a second direction D2 parallel to the upper surface of the support unit 100. The diameter W1 of the inner surface of an upper portion of the cylinder 210 may be greater than the diameter W2 of the inner surface of the nozzle 220. An inner surface of a lower portion of the cylinder 210 may have a diameter W1, which decreases as it travels closer to the nozzle 220. The cylinder 210 and the nozzle 220 may include a non-magnetic metal. For example, the cylinder 210 and the nozzle 220 may include stainless steel. In exemplary embodiments, the nozzle 220 may include a non-metal material. For example, the nozzle 220 may include a ceramic material. The extrusion unit 200 may be moved by the control unit 440. For example, the extrusion unit 200 may be moved by the control unit 440 in a direction perpendicular to the upper surface of the support unit 100 or in a direction parallel to the upper surface of the support unit 100, thereby capable of adjusting an extrusion location of the metal material.

The coil unit 300 may include a first coil 310 and a second coil 320 that are surrounding the cylinder 210, and a third coil 330 and a fourth coil 340 that are surrounding the nozzle 220. The first, second third and fourth coils 310,320, 330 and 340 may include a conductive line. The first second third and fourth coils 310, 320, 330 and 340 may receive a current. In exemplary embodiments, the first second third and fourth coils 310, 320, 330 and 340 may respectively receive a different current from each other. In exemplary embodiments, the first second third and fourth coils 310, 320, 330 and 340 may receive the same current to each other. The intensity and direction of the current flowing in the first second third and fourth coils 310, 320, 330 and 340 may be controlled by the control unit 440. The number of each of the first second third and fourth coils 310,320, 330 and 340 illustrated herein is exemplified, and not limited to the illustration.

The first coil 310 may surround an upper portion of the cylinder 210. In exemplary embodiments, the first coil 310 may extend in a helical shape along an upper outer surface of the cylinder 210. That is, the first coil 310 may include a solenoid wound around the upper portion of the cylinder 210. In exemplary embodiments, when a current flows in the first coil 310, a first magnetic field (not illustrated) rotating centered on the first coil 310 may be produced. The first magnetic field may pass through the upper portion of the cylinder 210 to be provided inside the cylinder 210.

The second coil 320 may surround a lower portion of the cylinder 210. For example, the second coil 320 may extend in a helical shape along a lower outer surface of the cylinder 210. The second coil 320 may include a solenoid wound around the lower portion of the cylinder 210. The second coil 320 may be wound more densely than the first coil. For example, the distance between conductive lines next to each other of the second coil 320 in the first direction D1 may be less than the distance between conductive lines next to each other of the first coil. The number of turns of the second coil 320 per the length of the lower portion of the cylinder 210 may be less than the number of turns of the first coil 310 per the length of the upper portion of the cylinder 210. The lengths of the upper and lower portions of the cylinder 210 may be the lengths along a direction from the upper end of the cylinder 210 towards the lower end of the cylinder 210. In exemplary embodiments, when a current flows in the second coil 320, a second magnetic field (not illustrated) rotating centered on the second coil 320 may be produced. The second magnetic field may pass through the lower portion of the cylinder 210 to be provided inside the cylinder 210. When an identical current flows in the first and second coils 310 and 320, the intensity of the second magnetic field may be greater than the intensity of the first magnetic field. When the intensity of the currents flowing in the first and second coils 310 and 320 is changed, the intensity of the first and second magnetic fields may also be changed. When the currents flowing in the first and second coils 310 and 320 are changed by an equal intensity, the intensity changed in the second magnetic field may be greater than the intensity changed in the first magnetic field.

The third coil 330 may surround the nozzle 220. For example, the third coil 330 may extend along an outer surface of the nozzle 220. For example, the third coil 330 may have a circular shape circling around the nozzle 220 centered on the nozzle 220. A conductive line of the third coil 330 may overlap the nozzle 220 in a direction parallel to the upper surface of the support unit 100. In exemplary embodiments, the third coil 330 may be disposed at a position equal to or greater than the height of a lower surface of the nozzle 220. When a current flows in the third coil 330, a third magnetic field (not illustrated) rotating centered on the third coil 330 may be produced. The third magnetic field may pass through the nozzle 220 to be provided inside the nozzle 220. In exemplary embodiments, the current flowing in the third coil 330 may include a pulse-type current.

The fourth coil 340 may be disposed adjacent to the lower portion of the nozzle 220. The fourth coil 340 may have a shape radially travelling in a direction away from the nozzle 220 while circling around the nozzle 220. The fourth coil 340 may be provided at a substantially equal height as the third coil 330 and the nozzle 220. The fourth coil 340 and the nozzle 220 may be spaced from the support unit 100 by a substantially equal distance. For example, the nearest distance between the fourth coil 340 and the support unit 100 may by substantially equal to the nearest distance between the nozzle 220 and the support unit 100. The fourth coil 340 may horizontally overlap the nozzle 220 and the third coil 330. In exemplary embodiments, the fourth coil 340 may be provided at a less position than the positions of the nozzle 220 and the third coil 330. The fourth coil 340 may be closer to the support unit 100 than the nozzle 200. For example, the nearest distance between the fourth coil 340 and the support unit 100 may be less than the nearest distance between the nozzle 220 and the support unit 100. When a current flows in the fourth coil 340, a fourth magnetic field (not illustrated) rotating centered on the fourth coil 340 may be produced. The fourth magnetic field may pass through a metal material 16 on the support unit 100.

The first magnetic field may melt a solid metal material (not illustrated) inside the upper portion of the cylinder 210 to form a liquid metal material (not illustrated). The liquid metal material may be moved in the lower portion of the cylinder 210. The second magnetic field may maintain or raise a temperature of the liquid metal material inside the lower portion of the cylinder 210. The liquid metal material may be moved in the nozzle 220. The third magnetic field may control an extruded shape of the liquid metal material being extruded from the nozzle 220. For example, the liquid metal material may be extruded in a droplet shape or continuously extruded. The fourth magnetic field may induction heat the metal material 16 on the support unit 100.

The temperature measurement unit 410 may generate a temperature data for the temperature of the extrusion unit 200 and transmit the same to the control unit 440. For example, the temperature measurement unit 410 may measure temperatures of the cylinder 210 and/or the metal material inside the cylinder 210. The control unit 440 may control the temperature of the cylinder 210 on the basis of the temperature data received from the temperature measurement unit 410.

The metal material supply unit 420 may supply a metal material (not illustrated) to the cylinder 210. The metal material supply unit 420 may supply a powder type metal material or a filament type metal material inside the cylinder 210. When the metal material is the powder type, the metal material supply unit 420 may include a cartridge receiving the powder type metal material therein. The powder type metal material may be supplied from the cartridge to the extrusion unit 200 in a required amount by the control unit 440. When the metal material is the filament type, the metal material supply unit 420 may include a filament roll on which the filament type metal material is wound. The filament type metal material wound on the filament roll may be supplied from the filament roll to the extrusion unit 200 in a required amount by the control unit 440.

The pressure supply unit 430 may provide pressure to the metal material so that the metal material is extruded from the inside of the extrusion unit 200 through the nozzle 220. The strength of the pressure may be adjusted by the control unit 440.

Figure 2:
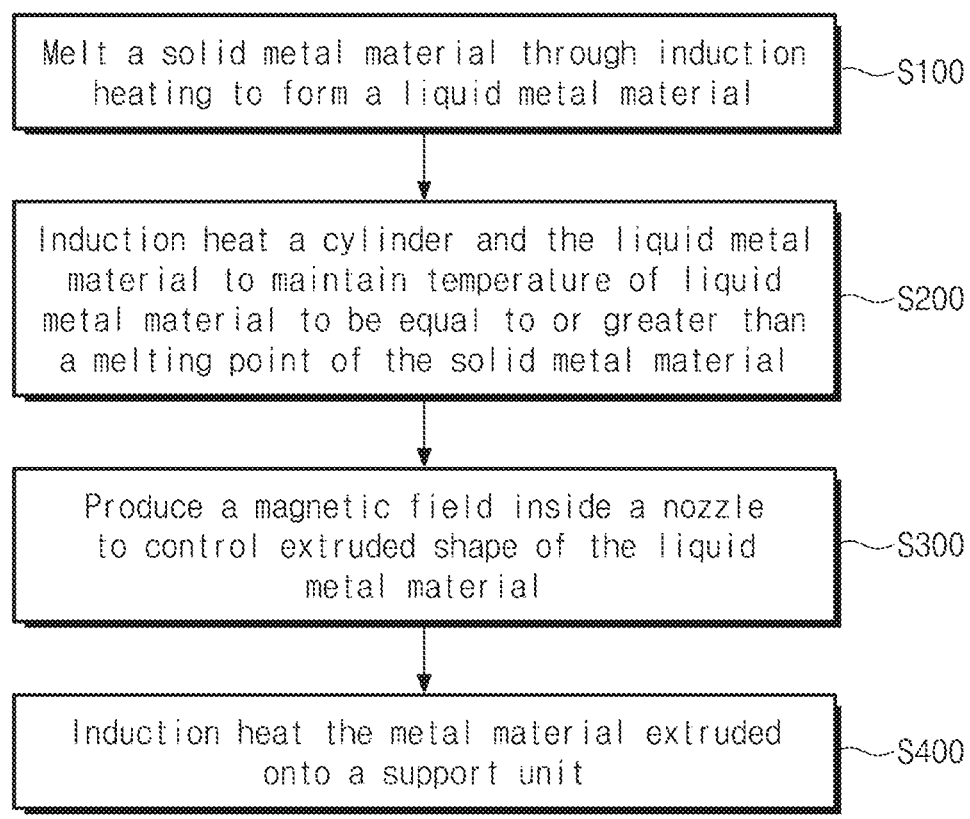
FIG. 2 is a flowchart to describe a method of extruding a metal material according to exemplary embodiments of the inventive concept.

According to exemplary embodiments of the inventive concept, an extruder for a metal material having a coil unit 300 disposed adjacent to an extrusion unit 200 may be provided. An extruded shape of the metal material may be controlled by magnetic and electric fields produced inside the extrusion unit 200. FIG. 2 is a flowchart to describe a method of extruding a metal material according to exemplary embodiments of the inventive concept. FIGS. 3 to 8 are cross-sectional views of an extruder for a metal material to describe a method of extruding a metal material according to exemplary embodiments of the inventive concept. For simplicity in description, description for content substantially identical to what is described with reference to FIG. 1 may be omitted.

Figure 3:
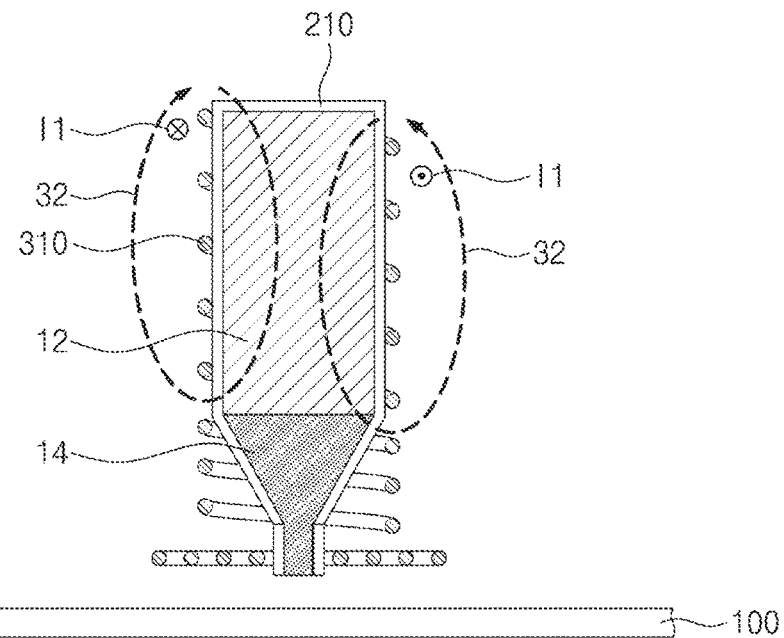
FIGS. 3 to 8 are cross-sectional views of an extruder for a metal material to explain a method of extruding a metal material according to exemplary embodiments of the inventive concept.

Referring to FIGS. 2 and 3, a solid metal material 12 may be provided inside the cylinder 210. The solid metal material 12 may be a powder type or a filament type. In an embodiment, the solid metal material 12 may be supplied from the metal material supply unit 420 to the inside of the cylinder 210.

A first current I1 may be provided inside the first coil 310. When viewed in a direction from the upper portion of the cylinder 210 towards the lower portion thereof (hereinafter referred to as "in a planar perspective"), the first current I1 may flow in a clockwise direction. A first magnetic field 32 may be produced by the first current I1 flowing in the first coil 310, the first magnetic field 32 rotating in a right handed screw direction. The first magnetic field 32 may pass through the cylinder 210 and the solid metal material 12 inside the cylinder 210. The cylinder 210 and the solid metal material 12 may be induction heated by the first magnetic field 32. Induction heating may be heating by an induction current flowing in the cylinder 210 and the solid metal material 12. The induction current flowing in the cylinder 210 and the solid metal material 12 may be generated when a direction and/or intensity of the magnetic field 32 passing through the cylinder 210 and the solid metal material 12 is changed. The induction heating may continue until the temperature of the solid metal material 12 arrives at a fusion point (or melting point) of the solid metal material 12. A liquid metal material 14 may be formed by melting the solid metal material 12 by the induction heating (S100). The liquid metal material 14 may be moved in the lower portion of the cylinder 210.

Figure 4:
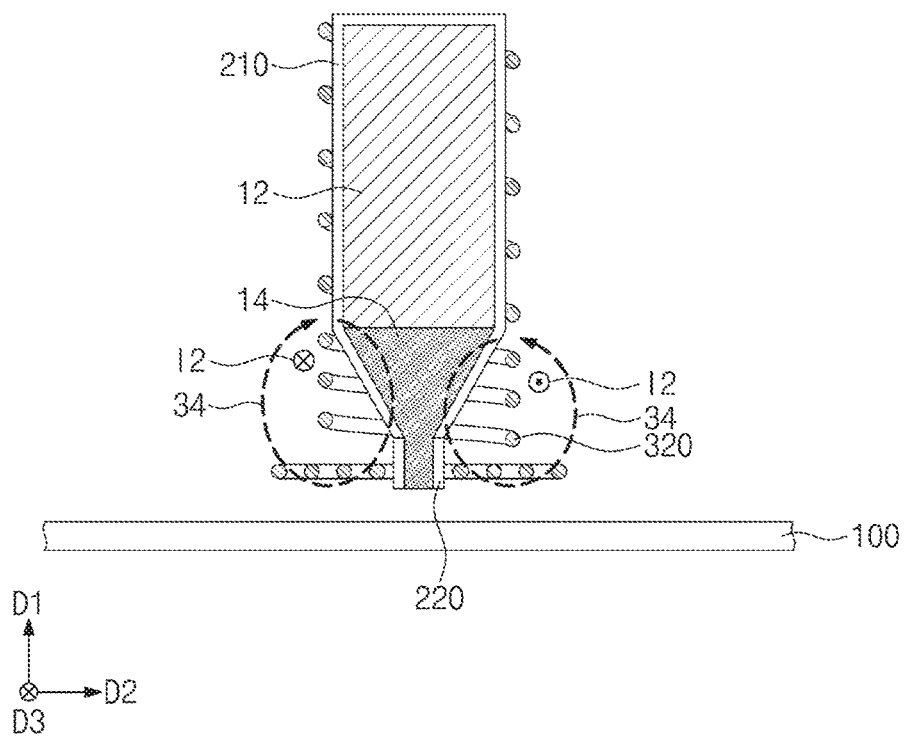

Referring to FIGS. 2 and 4, a second current 12 may be provided inside the second coil 320. In a planar perspective, the second current 12 may flow in the clockwise direction. A second magnetic field 34 may be produced by the second current 12 flowing in the second coil 320, the second magnetic field 34 rotating in a right handed screw direction. The second magnetic field 34 may pass through the cylinder 210 and the liquid metal material 14 inside the cylinder 210. The second magnetic field 34 may produce an induction current on the surfaces of the cylinder 210 and the liquid metal material 14. The cylinder 210 and the liquid metal material 14 may be induction heated by the induction current. A temperature of the liquid metal material 14 may be maintained greater than the fusion point (or melting point) of the solid metal material 12 by the induction heating (S200). Thereby, the liquid metal material 14 may be pre-vented from being hardened inside the cylinder 210. The liquid metal material 14 may be moved in the nozzle 220.

Figure 5:
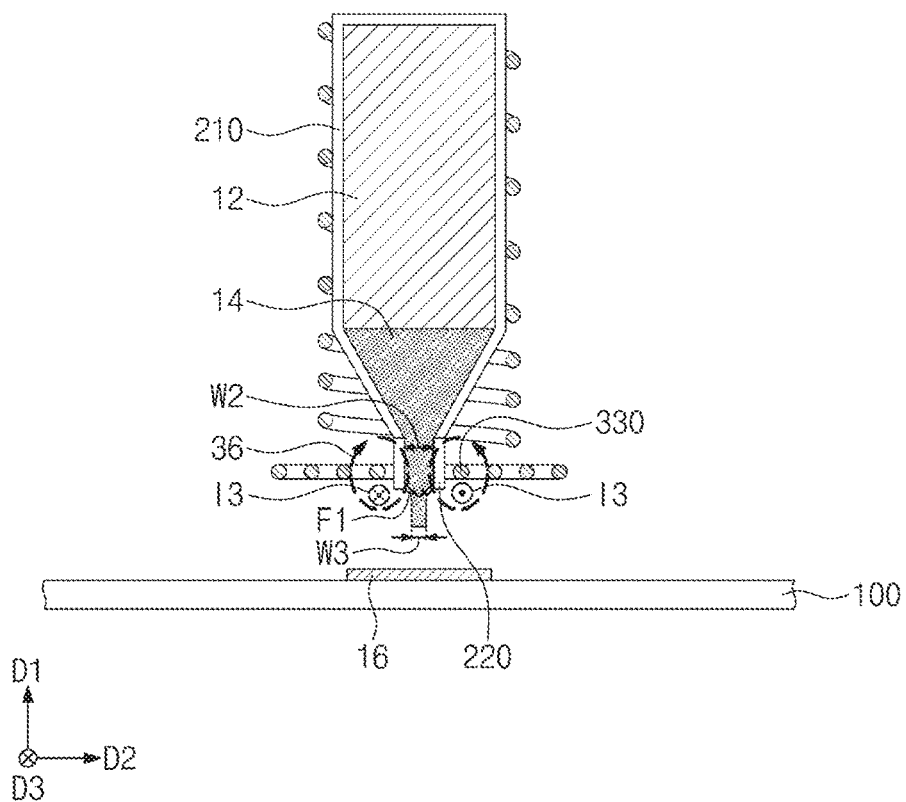
Figure 6:
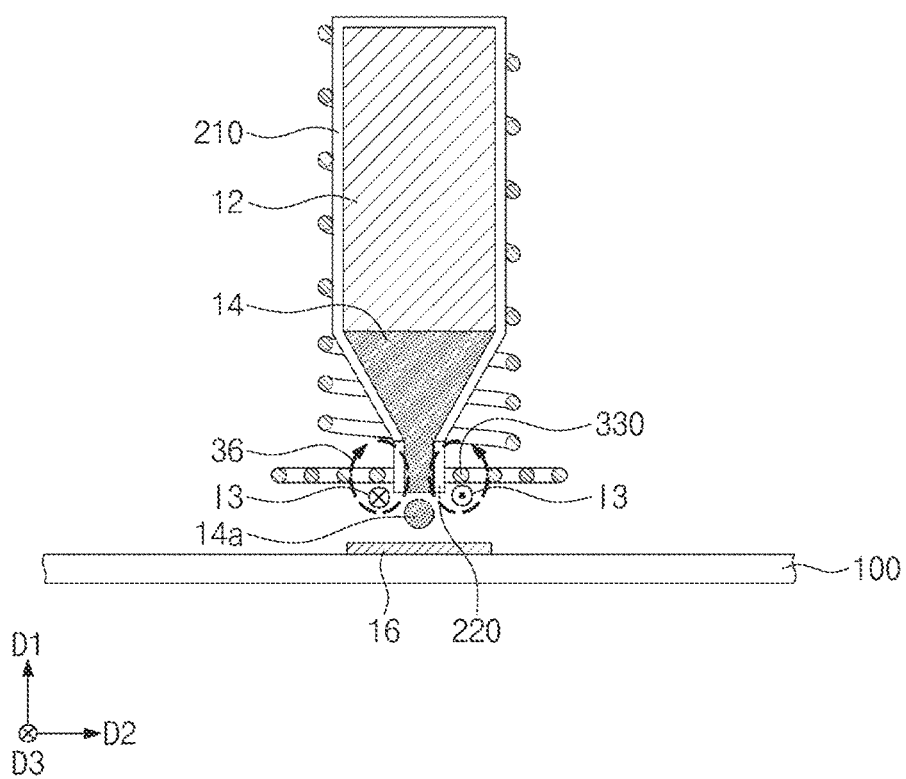

Referring to FIGS. 2, 5 and 6, the extruded shape of the liquid metal material 14 may be controlled by producing a third magnetic field 36 inside the nozzle 220 (S300). The third magnetic field 36 may be produced by a third current 13 flowing inside the third coil 330. The third magnetic field 36 may have a traveling direction rotating in the right handed screw direction. When viewed in a plane, the third current 13 may flow in the clockwise direction. In exemplary embodiments, the third current 13 may flow in the counterclockwise direction. The third magnetic field 36 may pass through the nozzle 220 and the liquid metal material 14 inside the nozzle 220. The third magnetic field 36 may travel from the inside to the outside of the liquid metal material 14 to pass through a lower portion of the liquid metal material 14. When the intensity and/or direction of the third magnetic field 36 are changed, an induction current (for example an eddy current) may be generated on a lower surface of the liquid metal material 14. For example, when the intensity of the third magnetic field 36 is increased, the induction current flowing in a direction opposite to the direction of the third current 13 may be generated on the lower surface of the liquid metal material 14. When the intensity of the third magnetic field 36 is decreased, the induction current flowing in the same direction as the direction of the third current 13 may be generated on the lower surface of the liquid metal material 14. When the induction current flowing in the direction opposite to the direction of the third current 13 is formed on the lower surface of the liquid metal material 14, a force F1 directed toward the center of the lower surface of the liquid metal material 14 may be applied to the lower portion of the liquid metal material 14 by an interaction of the third magnetic field 36 and the induction current. The extruded shape of the liquid metal material 14 extruded from the nozzle 220 may be controlled by the force F1 acting on the lower portion of the liquid metal material 14. For example, as illustrated in FIG. 5, a width W3 in the second direction D2 of the liquid metal material 14 extruded from the nozzle 220 may be less than a separation distance W2 along the second direction D2 between the inner surfaces of the nozzle 220. For example, as illustrated in FIG. 6, the liquid metal material 14 extruded from the nozzle 220 may be extruded in a droplet shape 14a. The liquid metal material 14 may be extruded from the nozzle 220 onto the support unit 100. For example, the liquid metal material 14 may be stacked on the metal material 16 on the support unit 100.

Figure 7:
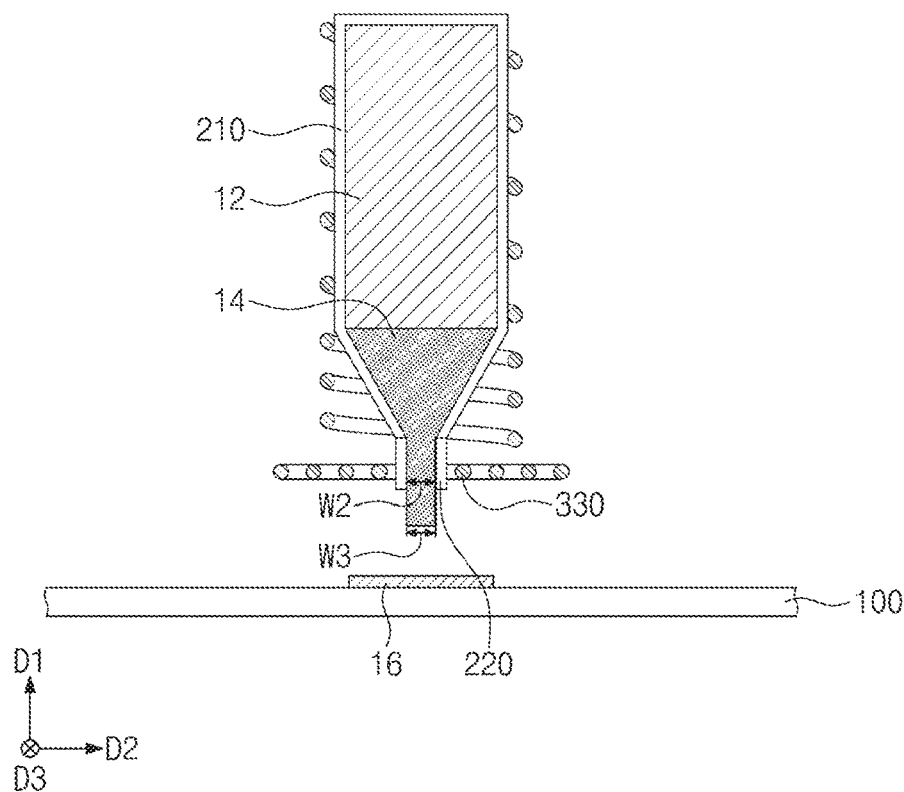

Referring to FIG. 7, unlike what is illustrated in FIGS. 5 and 6, the third current 13 may not be provided inside the third coil 330. In this case, the third magnetic field 36 passing through the liquid metal material 14 may not be produced in the inside of the nozzle 220. Also, an induction current may not be produced on the lower surface of the liquid metal material 14 extruded from the nozzle 220. Thus, the width W3 of the liquid metal material 14 extruded from the nozzle 220 may be substantially equal to the separation distance between the inner surfaces of the nozzle 220.

Figure 8:
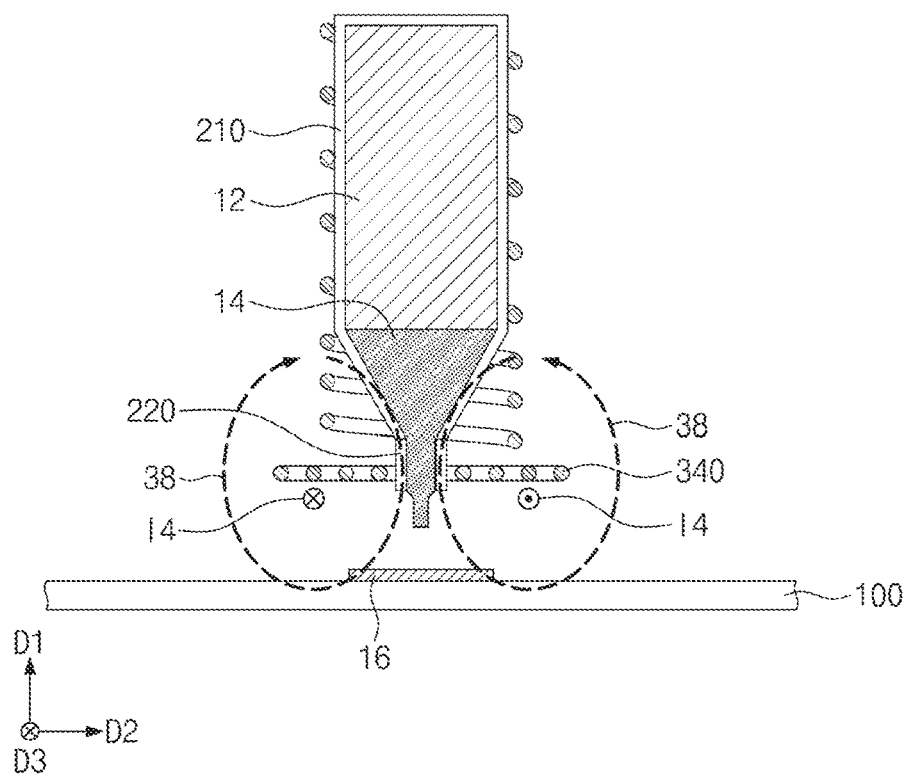

Referring to FIG. 8, a fourth current 14 may be provided to the fourth coil 340. In a planar perspective, the fourth current 14 may flow in the clockwise direction. A fourth magnetic field 38 rotating in the right handed screw direction may be produced by the fourth current 14 flowing inside the fourth coil 340. The fourth magnetic field 38 may pass through the metal material 16 on the support unit 100. An induction current (for example the eddy current) may be produced on the surface of the metal material 16 on the support unit 100 by the fourth magnetic field 38. The metal material 16 on the support unit 100 may be induction heated by the induction current (S400). When the metal material 16 on the support unit 100 is induction heated, a binding force between the metal material 16 on the support unit 100 and the liquid metal material 14 extruded on the metal material 16 may increase.

Figure 9:
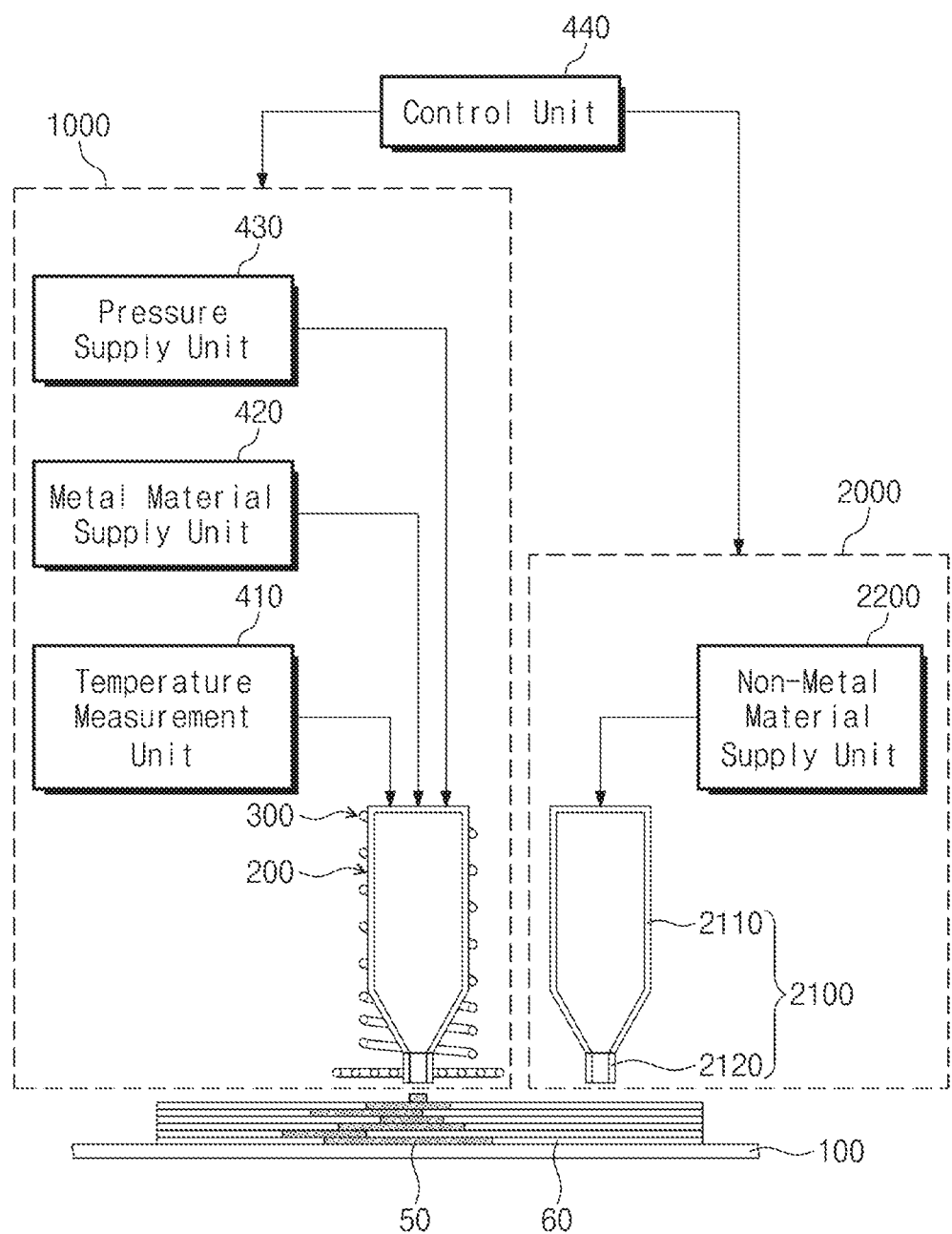
FIG. 9 is a schematic diagram of a 3D printer according to exemplary embodiments of the inventive concept.

FIG. 9 is a schematic diagram of a 3D printer according to exemplary embodiments of the inventive concept. For simplicity in description, description for content substantially identical to what is described with reference to FIG. 1 will be omitted.

Referring to FIG. 9, the 3D printer includes a support unit 100, a metal material printing unit 1000, a non-metal material printing unit 2000 and a control unit 440. The support unit 100 may be substantially same as the support unit 100 described with reference to FIG. 1. The metal material printing unit 1000 may include an extrusion unit 200, a coil unit 300, a temperature measurement unit 410, a metal material supply unit 420 and a pressure supply unit 430. The extrusion unit 200, the coil unit 300, the temperature measurement unit 410, the metal material supply unit 420 and the pressure supply unit 430 may be substantially same as what are described with reference to FIG. 1, respectively.

The non-metal material printing unit 2000 may extrude a non-metal material (not illustrated) (for example, a thermoplastic resin material (ABS, PLA, PI, PMMA, PTFE, PEEK and urethane), glass and an amorphous-based material, a ceramic-based material, a magnetic body) onto the support unit 100. The non-metal material printing unit 2000 may include a non-metal material extrusion unit 2100. The non-metal material extrusion unit 2100 may include a cylinder 2110 providing a space in which the non-metal material is received, and a nozzle 2120 extending from a lower end of the cylinder 2110. The non-metal material may be melted in the inside of the non-metal material extrusion unit 2100 to be extruded onto the support unit 100 through the nozzle 2120. In exemplary embodiments, the non-metal material may be melted through the cylinder 2110 and the nozzle 2120 that are induction heated by a method substantially identical to what is described with reference to FIGS. 2 to 8. In this case, a coil (not illustrated) may be provided on an outer surface of the non-metal material extrusion unit 2100. The coil may be substantially the same as the first and second coils 310 and 320 described with reference to FIG. 1. As described with reference to FIGS. 2 to 4, the cylinder 2110 and the nozzle 2120 may be induction heated by providing a current to the coil. However, above disclosure for the method of melting the non-metal material is exemplified, and the method is not limited to the disclosure. For example, in another embodiment, the non-metal material may be melted through a heating device (not illustrated) provided in the inside of the non-metal material extrusion unit 2100.

The non-metal material printing unit 2000 may include a non-metal material supply unit 2200. The non-metal material supply unit 2200 may provide a non-metal material in the inside of the non-metal material extrusion unit 2100. In exemplary embodiments, the non-metal material may be a powder type or a filament type. When the non-metal material is the powder type, the non-metal material supply unit 2200 may include a cartridge having the powder type non-metal material received therein. The powder type non-metal material may be supplied in a required amount from the cartridge to the non-metal material extrusion unit 2100 by the control unit 440. When the non-metal material is the filament type, the non-metal material supply unit 2200 may include a filament roll having the filament type non-metal material wound thereon. The filament type non-metal material wound on the filament roll may be supplied in a required amount from the filament roll to the non-metal material extrusion unit 2200 by the control unit 440.

The non-metal material printing unit 2000 may include a temperature measurement unit (not illustrated) configured to measure a temperature inside the non-metal material extrusion unit 2100, and a pressure supply unit (not illustrated) providing pressure to the non-metal material.

According to exemplary embodiments of the inventive concept, a 3D printer may include a metal material printing unit 1000 and a non-metal material printing unit 2000. The metal material printing unit 1000 and the non-metal material printing unit 2000 may extrude a metal material 50 and a non-metal material 60 onto a support unit 100. The metal material 50 and the non-metal material 60 may contact with each other. For example, the metal material 50 may be stacked on the non-metal material 60, or vice versa. The metal material 50 may be provided onto the support unit 100 through induction heating.

Figure 10:
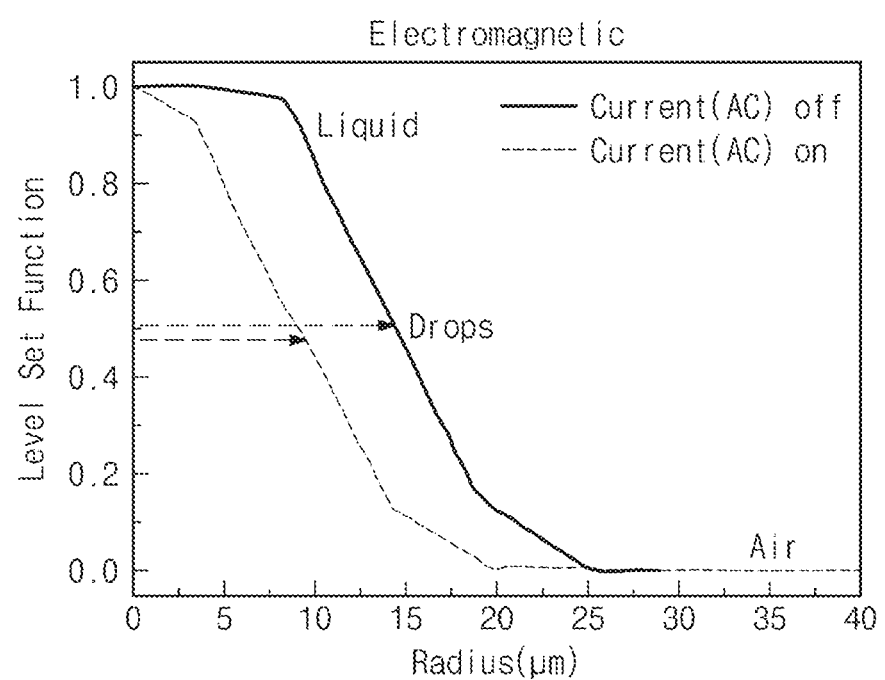
FIG. 10 is a graph to describe a characteristic of an extruding a metal material according to exemplary embodiments of the inventive concept.

FIG. 10 is a graph to describe a characteristic of an extruding a metal material according to exemplary embodiments of the inventive concept.

Referring to the FIG. 10, the solid line represents the existence probability of the melted metal material according to the distance from the center of the nozzle when the current was not provided to the third coil. The dotted line represents when the current was provided to the third coil. When the existence probability of the melted metal material is 0.5 (that is, the value on the y-axis is 0.5), the droplet is produced.

The graph of FIG. 10 was drawn from Simulation Method using Finite Elements Method. Finite Elements Method is a method for calculating values by dividing a continuous structure into finite number of elements and applying an approximation scheme based on energy principle to each of the divided elements. A diameter of a nozzle was 50 micrometer (μm). A material of the nozzle was copper (Cu). The root-mean-square value of the current was 1000 A. The frequency of the current was 100 kHz. A metal material was Galinstan. Air pressure was provided to the metal material to extrude the metal material from the nozzle. When the current was not provided to the third coil, the radius of the droplet was about 15 micrometer (μm). When the current was provided to the third coil, the radius of the droplet was about 10 micrometer (μm). As a result, the radius of the droplet decreases when the current is provided to the third coil.

Figure 11:
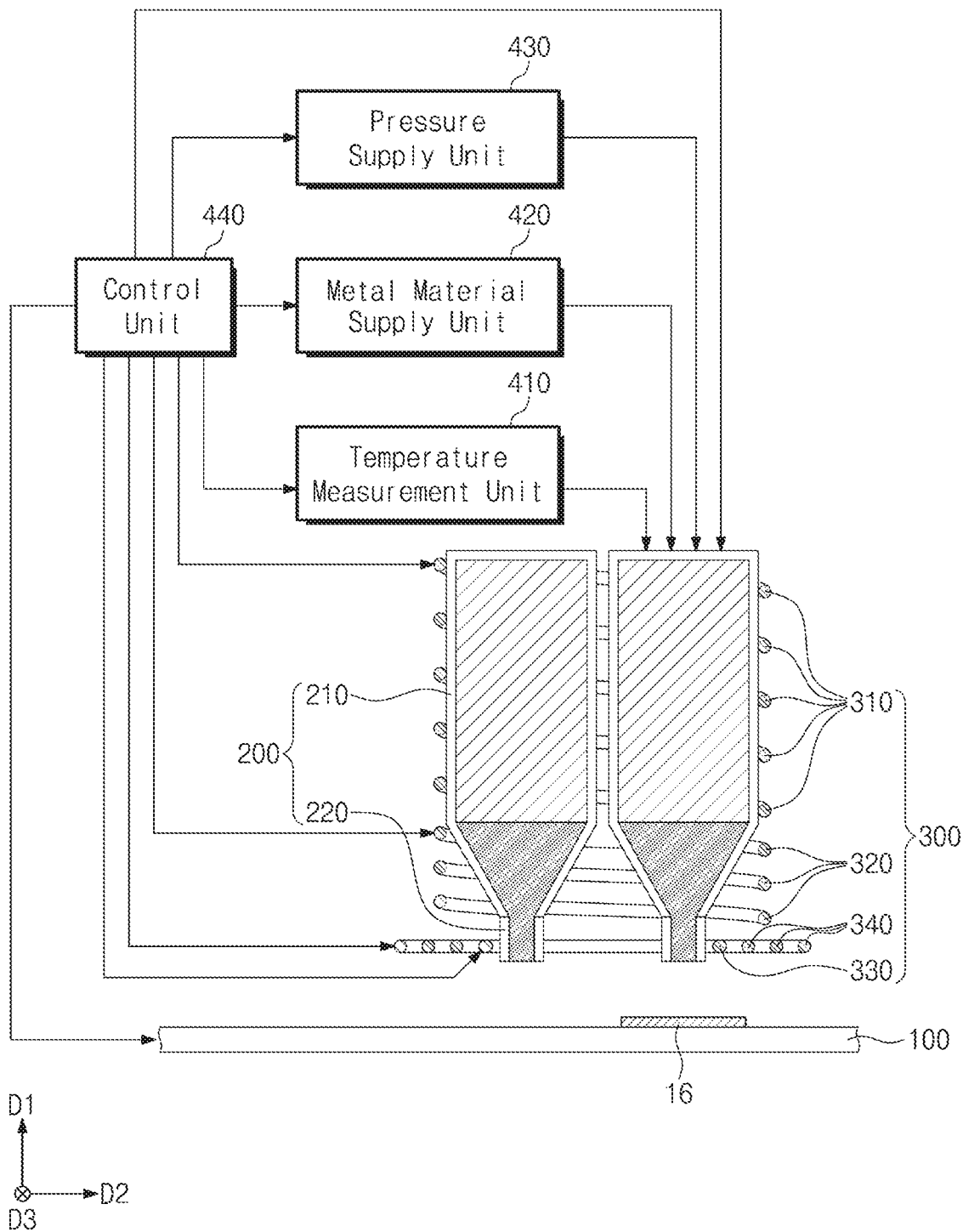
FIG. 11 is a cross-sectional view of an extruder for a metal material according to exemplary embodiments of the inventive concept.

FIG. 11 is a cross-sectional view of an extruder for a metal material according to exemplary embodiments of the inventive concept. For simplicity in description, description for content substantially identical to what is described with reference to FIG. 1 may be omitted.

Referring to FIG. 11, the extruder for a metal material may include a support unit 100, an extrusion unit 200 melting and extruding a metal material (not illustrated) onto the support unit 100, a coil unit 300 surrounding the extrusion unit 200, a temperature measurement unit 410, a metal material supply unit 420, a pressure supply unit 430 and a control unit 440. Except for the extrusion unit 200 and the coil unit 300, the extruder for the metal material of FIG. 11 may be substantially identical to the extruder for the metal material of FIG. 1.

The extrusion unit 200 may be in plural. For example, two extrusion units 200 are illustrated. Each of the extrusion units 200 may be substantially identical to the extrusion unit 200 described in FIG. 1. The extrusion units 200 may be spaced apart from each other along the second direction D2. The extrusion units 200 may respectively extrude the metal materials differed from each other. According to the inventive concept, the various metal materials may be extruded at the same time to increase the speed of extrusion.

Unlike what is illustrated in FIG. 1, the coil unit 300 may surround a plurality of the extrusion units 200. That is, the coil unit 300 may not be provided between the plurality of the extrusion units 200.

Figure 12:
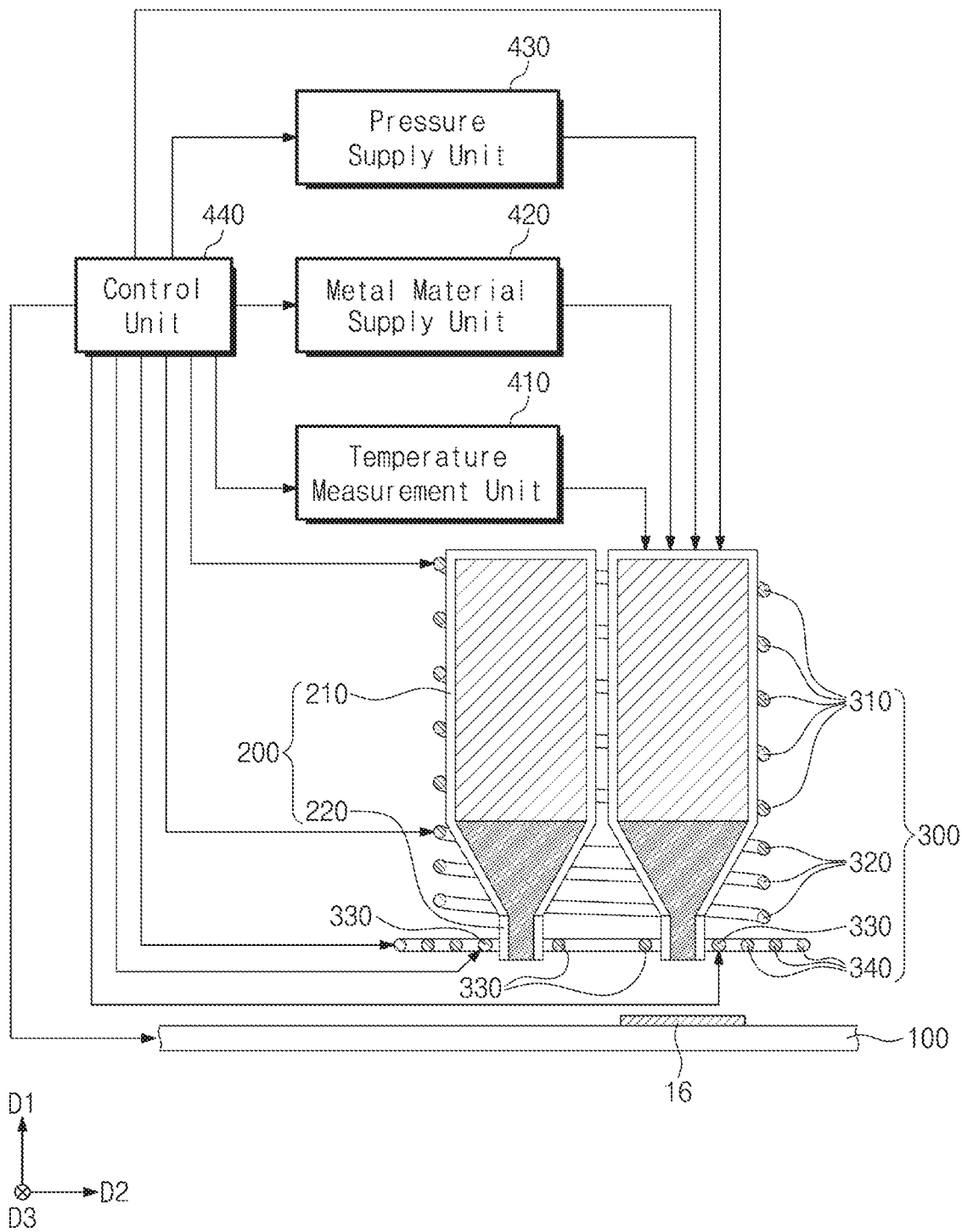
FIG. 12 is a cross-sectional view of an extruder for a metal material according to exemplary embodiments of the inventive concept.

FIG. 12 is a cross-sectional view of an extruder for a metal material according to exemplary embodiments of the inventive concept. For simplicity in description, description for content substantially identical to what is described with reference to FIG. 11 may be omitted.

Referring to FIG. 12, the extruder for a metal material may include a support unit 100, an extrusion unit 200 melting and extruding a metal material (not illustrated) onto the support unit 100, a coil unit 300 surrounding the extrusion unit 200, a temperature measurement unit 410, a metal material supply unit 420, a pressure supply unit 430 and a control unit 440. Except for a third coil 330, the extruder for the metal material of FIG. 12 may be substantially identical to the extruder for the metal material of FIG. 11. Unlike what is illustrated in FIG. 11, the coil unit 300 may comprise third coils 330. The third coils 330 may surround a plurality of the extrusion units 200, respectively. For example, the third coils 330 may surround a plurality of nozzles, respectively. That is, the third coils 330 may be provided between the plurality of the nozzles. Currents supplied to the third coils 330 may be different from each other. That is, the control unit 440 may individually control the currents supplied to the third coils 330.

An extruder for a metal material according to exemplary embodiments of the inventive concept may include a coil unit provided on an outer surface of an extrusion unit receiving a metal material therein. When a current flows in the coil unit, the metal material inside the extrusion unit may be induction heated to be melted. When the melted metal material is extruded onto a support unit from the extrusion unit, the current is supplied to the coil unit so as to control an extruded shape of the metal material. When the metal material is extruded again on the metal material extruded onto the support unit, the current is supplied to the coil unit so as to heat the metal material extruded onto the support unit. However, an advantageous effect of the inventive concept is not limited the disclosure set forth herein.

As described above, the description of the embodiments according to the inventive concept provides illustrations for explanation of the technical idea of the inventive concept. Accordingly, the technical idea of the inventive concept is not limited to the embodiments set forth herein, and it is apparent that the technical idea of the inventive concept may be variously changed or modified by those of ordinary skilled in the art by combining the embodiments without departing from the scope of the technical idea of the inventive concept.

What is claimed is:

1. An extruder for a metal material, the extruder comprising:
   a cylinder having a receiving space in which a solid metal material is provided;
   a nozzle extending from a lower end of the cylinder;
   an upper coil comprising a first coil and a second coil, the first coil surrounding an upper portion of an outer surface of the cylinder and the second oil surrounding a lower portion of the outer surface of the cylinder, wherein the first coil and the second coil produce a first magnetic field and a second magnetic field passing through the cylinder and are configured to melt the solid metal material provided inside the cylinder to form a liquid metal material; and
   a lower coil comprising a third coil and a fourth coil, the third coil surrounding an outer surface of the nozzle, and the fourth coil directly surrounding the third coil, wherein the third coil is provided between the fourth coil and the nozzle, and the fourth coil is provided at an equal height as the third coil and the nozzle,
   wherein the third coil produces a coil third magnetic field passing through the nozzle and is configured to control an extruded shape of the liquid metal material inside the nozzle,
   wherein the fourth coil produces a fourth magnetic field passing through an extruded metal material to induction-heat the extruded metal material.

2. The extruder of claim 1, wherein the first coil and the second coil produces the first magnetic field and the second magnetic field inside the cylinder to induction-heat the cylinder and the solid metal material.

3. The extruder of claim 1, wherein the first coil produces the first magnetic field inside the upper portion of the outer surface of the cylinder, and the second coil produces the second magnetic field which is greater than the first magnetic field inside the lower portion of the outer surface of the cylinder.

4. The extruder of claim 1, wherein the upper coil is wound in a helical shape around the cylinder.

5. The extruder of claim 1, wherein the upper coil is more densely wound around lower portion of the surface of the cylinder than around the upper portion of the surface of the cylinder.

6. The extruder of claim 1, wherein the cylinder and the nozzle comprise a non-magnetic metal.

7. The extruder of claim 1, wherein the cylinder comprises a non-magnetic metal, and the nozzle comprises a non-metal.

8. The extruder of claim 1, wherein the fourth coil and the nozzle are disposed at the same height from an upper surface of a support unit.

9. The extruder of claim 1, further comprising a temperature measurement unit configured to measure the temperature inside the cylinder.

10. The extruder of claim 9, further comprising a control unit configured to adjust the temperature of the cylinder on the basis of data for the temperature inside the cylinder measured by the temperature measurement unit.

11. The extruder of claim 10, wherein the control unit adjusts the temperature of the cylinder by controlling a current flowing in the upper coil.

12. The extruder of claim 1, wherein the upper coil and the third coil receive different currents.

* * * * *